United States Patent
De Azevedo et al.

(10) Patent No.: US 7,051,408 B2
(45) Date of Patent: May 30, 2006

(54) SPRING CLIP FOR FIXING TWO PARTS TO EACH OTHER

(75) Inventors: Helder De Azevedo, Sainville (FR); Dominique Dubost, La Celle St Cloud (FR)

(73) Assignee: Attax, La Celle St Cloud (FR)

( * ) Notice: Subject to any disclaimer, the term of this patent is extended or adjusted under 35 U.S.C. 154(b) by 55 days.

(21) Appl. No.: 10/854,760

(22) Filed: May 27, 2004

(65) Prior Publication Data

US 2005/0000063 A1   Jan. 6, 2005

(30) Foreign Application Priority Data

May 28, 2003  (FR) .................................. 03 06531
Jan. 21, 2004  (FR) .................................. 04 00556

(51) Int. Cl.
  *E04F 19/02*  (2006.01)
  *A44B 21/00*  (2006.01)
  *A44B 17/00*  (2006.01)
  *F16B 21/00*  (2006.01)

(52) U.S. Cl. .............................. 24/295; 24/289; 24/293
(58) Field of Classification Search .................. 24/289, 24/293, 295
  See application file for complete search history.

(56) References Cited

U.S. PATENT DOCUMENTS

| 4,402,118 A | * | 9/1983 | Benedetti | 24/289 |
| 6,101,686 A | * | 8/2000 | Velthoven et al. | 24/295 |
| 6,141,837 A | | 11/2000 | Wisniewski | |
| 6,279,207 B1 | * | 8/2001 | Vassiliou | 24/293 |
| 6,353,981 B1 | * | 3/2002 | Smith | 24/295 |
| 6,691,380 B1 | * | 2/2004 | Vassiliou | 24/295 |
| 6,928,705 B1 | * | 8/2005 | Osterland et al. | 24/295 |
| 2002/0194710 A1 | | 12/2002 | Dickinson et al. | |

FOREIGN PATENT DOCUMENTS

| DE | 32 45 056 A1 | 6/1984 |
| EP | 855 523 A1 | 7/1998 |
| JP | 11 072108 | 3/1999 |
| WO | WO 03/100267 A1 | 12/2003 |

\* cited by examiner

*Primary Examiner*—Robert J. Sandy
(74) *Attorney, Agent, or Firm*—Sughrue Mion, PLLC

(57) ABSTRACT

This clip in the general shape of a V comprising an intermediate portion (5) from which two lateral wings (6, 7) extend, provided with outward tab means (8, 9) comprising angled spring means (12, 13) for parting a point of resistance and for holding the clip (1) on the edges of a hole (4) in a first part (2) and with inward tab means (10, 11) provided with means (20) for gripping the second part, in order to fix this second part (3) to the first (2), is characterized in that the inward tab means comprise portions (18, 19) which are bent toward the interior of the clip in the direction of its intermediate portion (5), in that the means (20) for gripping the second part (3) are situated on these bent portions of the inward tab means, and that the points where the latter are bent (21) are situated at the level of the angled means (12, 13) of the outward tab means (8, 9).

10 Claims, 2 Drawing Sheets

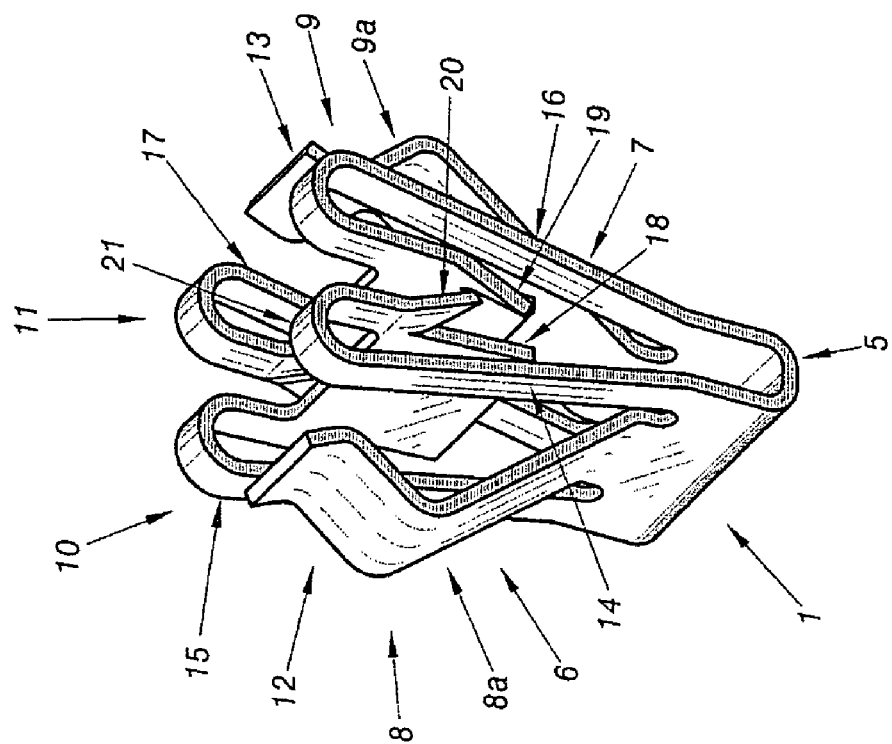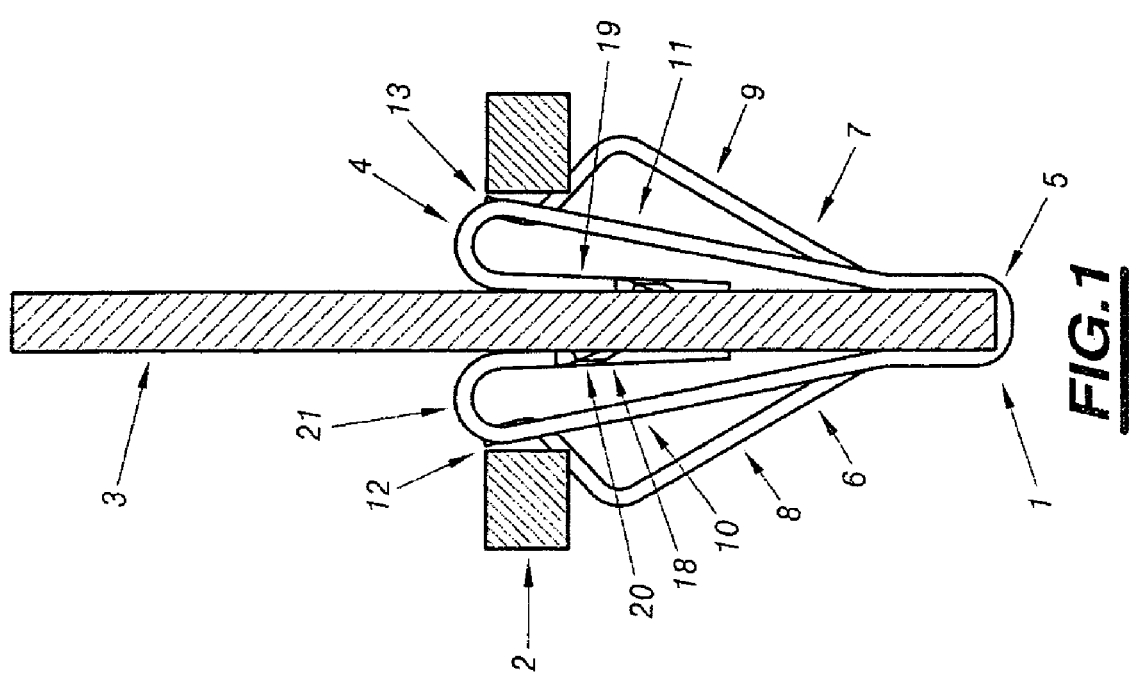

SPRING CLIP FOR FIXING TWO PARTS TO EACH OTHER

BACKGROUND OF THE INVENTION

The present invention relates to a spring clip for fixing two parts to each other.

Such spring clips have numerous applications particularly in the automotive industry for fixing two pieces of equipment of a vehicle to each other.

In the prior art there are spring clips of this kind which are in the general shape of a V comprising an intermediate portion from which lateral wings extend.

These lateral wings of the clip are then provided with outward tab means comprising angled spring means for passing a point of resistance, and for holding the clip on the edges of a hole in for example a first part and with inward tab means provided with means for gripping the second part in order to fix this second part to the first.

In the prior art, the inward tab means of the clip extend away from the clip's intermediate portion, rising part of the way up the height of the outward tab means and defining a passageway in which the second part can be received.

However, this type of clip has a number of drawbacks, particularly in terms of the difficulty of inserting the second part into the passageway defined by the inward tab means of the clip and in terms of the reliability of the fixing.

What is more, such clips can be a source of vibrations and therefore of noise.

SUMMARY OF THE INVENTION

It is therefore an object of the invention to solve these problems.

To this end, the subject of the invention is a spring clip for fixing two parts to each other, in the general shape of a V comprising an intermediate portion from which the lateral wings extend, provided with outward tab means comprising angled spring means for passing a point of resistance and for holding the clip on the edges of a hole in a first part and with inward tab means provided with means for gripping the second part in order to fix this second part to the first, which clip is characterized in that the inward tab means comprise portions which are bent toward the interior of the clip in the direction of its intermediate portion, in that the means for gripping the second part are situated on these bent portions of the inward tab means, and that the points where the latter are bent are situated adjacent to the angled means of the outward tab means.

In accordance with other features:

- each lateral wing of the V-shaped clip comprises a central outward tab, situated on each side of which is a lateral inward tab;
- the ends of the lateral inward tabs on each side of the clip are connected by a bearing plate, the edges of which have the means for gripping the second part;
- the gripping means are in the form of barbs;
- the means for gripping the second part are formed by the ends of the bent portions of the inward tab means and are adapted to bear against abutment means on this second part;
- the ends of the lateral inward tabs on each side of the clip are connected by a bearing plate, the edges of which form the means for gripping the second part;
- the means of abutment of the second part are formed by parts of the latter that are in relief;
- the means of abutment of the second part are formed by an edge of a hole formed in the latter;
- the means of abutment of the second part are formed by a shoulder on the latter; and
- it is made in one piece from a sheet-metal blank by cutting and deforming it.

BRIEF DESCRIPTION OF THE DRAWINGS

A clearer understanding of the invention will be gained from a reading of the description given below purely by way of example, with reference to the appended drawings, in which:

FIG. 1 is a side view of the spring clip according to the invention in the installed position in which it fixes two parts to each other;

FIG. 2 is a perspective view of such a clip;

DETAILED DESCRIPTION OF THE INVENTION

Figure 4:
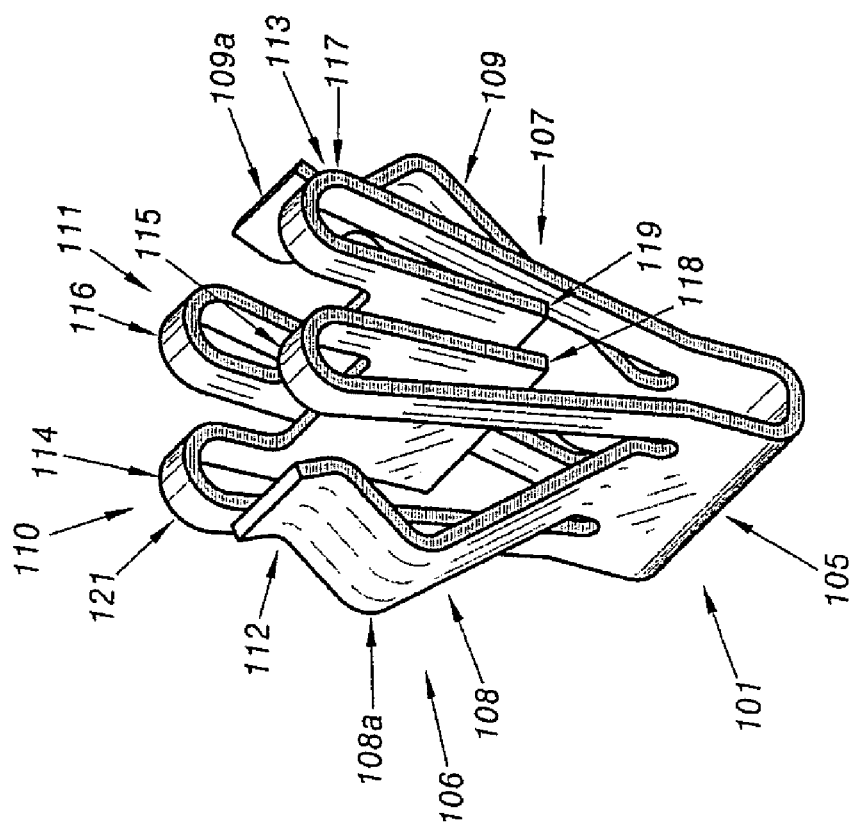
FIG. 4 is a perspective view of the clip illustrated in FIG. 3.

Shown in the FIGS. 1 and 2 is a spring clip denoted by the general reference 1 for fixing two parts to each other, these parts being formed for example by pieces of equipment for a motor vehicle.

One of the parts is denoted by the general reference 2 in these figures, while the other part is denoted by the general reference 3.

The first part, such as for example part 2, contains a hole denoted by the general reference 4 in which the clip is engaged. The second part, for example 3, is held by the clip 1.

For this purpose, the spring clip is in the general form of a V comprising an intermediate portion denoted by the general reference 5, with lateral wings denoted by the general references 6 and 7 in these figures extending away from it.

These lateral wings 6 and 7 of the clip 1 are provided with outward tab means, denoted by the general references 8 and 9 in these figures, and inward tab means denoted by the general references 10 and 11.

Actually, the outward tab means of the clip have, as is more clearly visible in FIG. 2, a central outward tab on each side of the clip, that is 8a and 9a, each being provided for example in the vicinity of its free end, with angled spring means for passing a point of resistance and denoted by the general references 12 and 13 in these figures, to ensure the elastic attachment of the clip to the edges of the hole 4 of the first part 2.

The inward tab means denoted by the general references 10 and 11 comprise, on each side of the clip, two inward tabs 14, 15 and 16, 17, respectively, one on each side of each outward tab 8a and 9a respectively.

As shown in these figures, these inward tabs include portions that are bent towards the interior of the clip, in the direction of its immediate portion 5, these portions taking the form of, for example, bearing plates denoted by the general references 18 and 19 in the figures, these connecting together the corresponding tabs on each side of the clip.

These bearing plates are provided with means of gripping the second part 3, these gripping means being formed for example by barbs such as the barb 20 on one of the edges of the bearing plate 18 connecting inward tabs 14 and 15.

In fact, the points where these inward tabs are bent, such as for example the points denoted by the general reference 21 in this figure, in the case of inward tab 14, are situated along side the angled means 12, 13 of the outward tabs.

It can therefore be seen that such a clip has a number of advantages, particularly when it comes to holding the second part without play relative to the first. In addition, insertion of the second part between the inward tabs of the clip is also facilitated by the presence of the points where they are bent, which guide the second part during its insertion into the clip.

Clearly, other embodiments of this clip can also be envisaged and it will be observed that the clip can be produced in one piece by cutting and deforming, for example, a sheet-metal blank.

Figure 3:
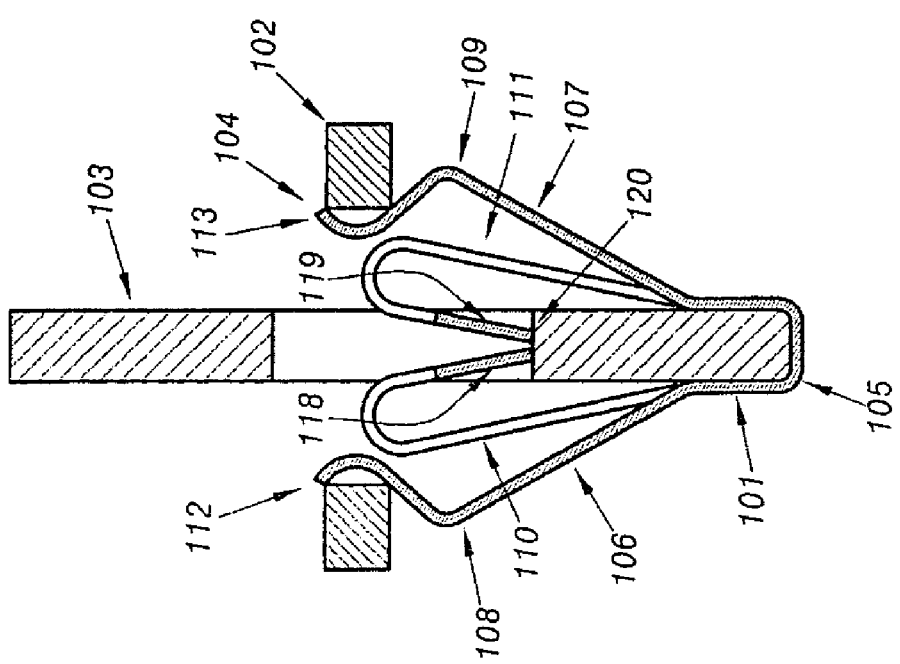
FIG. 3 shows an alternative embodiment of this clip.

Thus, for example, FIGS. 3 and 4 show a variant of this spring clip which is denoted by the general reference 101 and which makes it possible to fix two parts to each other, these parts being formed for example by pieces of equipment of a motor vehicle.

One of the parts is denoted by the general reference 102 in these figures, while the other part is denoted by the general reference 103.

The first part, such as part 102 for example, comprises a hole denoted by the general reference 104 in which the clip 101 is engaged. The second part, for example 103, is held in the clip 101.

For this purpose, this spring clip is in the general shape of a V comprising an intermediate portion denoted by the general reference 105, with lateral wings denoted by the general references 106 and 107 in these figures extending away from it.

These lateral wings 106 and 107 of the clip 101 are provided with outward tab means denoted by the general references 108 and 109 in these figures, and with inward tab means denoted by the general references 110 and 111.

In fact, the outward tab means of the clip comprise, as is more clearly visible in FIG. 2, a central outward tab on each side of the clip, namely 108a and 109a, which is provided for example in the vicinity of its free end with angled spring means for passing a point of resistance, denoted by the general references 112 and 113 in these figures, to ensure the elastic attachment of the clip to the edges of the hole 104 of the first part 102.

The inward tab means denoted by the general references 110 and 111 comprise, on each side of the clip, two inward tabs 114, 115 and 116, 117, respectively, situated on each side of this outward tab 108a and 109a, respectively.

As illustrated in these figures, these inward tabs comprise portions which are bent towards the interior of the clip in the direction of its intermediate portion 105, these portions ending for example in the form of bearing plates denoted by the general references 118 and 119 in these figures, which connect together with ends of the corresponding tabs on each side of the clip.

The forward edges of these bearing plates actually form means of gripping the second part 103 in that these bearing plates are adapted to abut against complementary means of abutment of this part 103.

In the illustrative embodiment shown in these figures, part 103 contains a hole 120, and the plates 118 and 119 of the clip press against one edge of this hole to lock this clip and the part 103 in position.

It goes without saying of course that other embodiments may be envisaged.

For example, the inward tabs may have means of gripping the second part that are shaped otherwise than in the illustrations.

Likewise, it is also possible to envisage this part having means of abutment that are not one edge of the hole of the latter.

For example, it is also possible to envisage means of abutment formed by relief parts such as for example a shoulder on this part.

Actually, the points where these inward tabs are bent, such as for example the point denoted by the general reference 121 in these figures, in respect of inward tab 114, are situated adjacent to the angled means 112, 113 of the outward tabs.

It will thus be seen that a clip of this kind has a number of advantages, particularly when it comes to keeping the second part in position without play relative to the first.

Moreover, the engagement of the second part between the input tabs of this clip is also facilitated by the presence of the points where they are bent, which guide this second part during insertion into the clip.

Clearly, other embodiments of this clip may also be envisaged, and it will be observed that the clip can also be made in one piece by cutting and deforming, for example, a sheet-metal blank.

The invention claimed is:

1. A spring clip for fixing two parts to each other, in the general shape of a V comprising an intermediate portion (5; 105) from which lateral wings (6, 7; 106, 107) extend, provided with outward tab means (8, 9; 108, 109) comprising angled spring means (12, 13; 112, 113) for passing a point of resistance and for holding the clip (1; 101) on the edges of a hole (4; 104) in a first part (2; 102) and with inward tab means (10, 11; 110, 111) provided with means (20; 118, 119) for gripping the second part (3; 103), in order to fix this second part (3; 103) to the first (2; 102), which clip is characterized in that the inward tab means (10, 11; 110, 111) comprise portions (18, 19; 118, 119) which are bent toward the interior of the clip in the direction of its intermediate portion (5; 105), in that the means (20; 118, 119) for gripping the second part are situated on these bent portions of the inward tab means, and in that points where the latter are bent (21; 121) are situated adjacent to the angled means (12, 13; 112, 113) of the outward tab means (8, 9; 108, 109).

2. The clip according to claim 1, characterized in that the outward tab means of each lateral wing (6, 7; 106, 107) of the V-shaped clip (1; 101) comprises a central outward tab portion (8a, 9a; 108a, 109a), situated on each side of which is a lateral inward tab (14, 15, 16, 17; 114, 115, 116, 117) of said inward tab means.

3. The clip according to claim 2, characterized in that the ends of the lateral inward tab portions (14, 15, 16, 17) on each side of the clip are connected by a bearing plate (18, 19), the edges of which have the means (20) for gripping the second part.

4. The clip according to claim 3, characterized in that the gripping means are in the form of barbs.

5. The spring clip according to claim 2, characterized in that the means (118, 119) for gripping the second part are formed by the ends of the bent portions of the inward tab means and are adapted to bear against abutment means (120) on this second part (103).

6. The clip according to claim 5, characterized in that the ends of the lateral inward tabs (114, 115, 116, 117) on each side of the clip are connected by a bearing plate (118, 119), the edges of which form the means for gripping the second part.

7. The clip according to claim 5, characterized in that the means for gripping the second part (103) are adapted to bear against parts of the second part that are in relief.

8. The clip according to claim 7, characterized in that the means for gripping the second part are adapted to bear against an edge of a hole (120) formed in the second part.

9. The clip according to claim 7, characterized in that the means for gripping the second part are adapted to bear against a shoulder on the second part.

10. The clip according to claim 1, characterized in that the clip is made in one piece from a sheet-metal blank by cutting and deforming it.

\* \* \* \* \*